(12) United States Patent
Tsuneyoshi (10) Patent No.: US 10,047,499 B2
(45) Date of Patent: Aug. 14, 2018

(54) WELDED STRUCTURE AND MACHINERY

(71) Applicant: CATERPILLAR SARL, Geneva (CH)

(72) Inventor: Takeshi Tsuneyoshi, Tokyo (JP)

(73) Assignee: Caterpillar SARL, Geneva (CH)

( * ) Notice: Subject to any disclaimer, the term of this patent is extended or adjusted under 35 U.S.C. 154(b) by 590 days.

(21) Appl. No.: 14/442,663

(22) PCT Filed: Oct. 23, 2013

(86) PCT No.: PCT/JP2013/078677
§ 371 (c)(1),
(2) Date: May 13, 2015

(87) PCT Pub. No.: WO2014/077094
PCT Pub. Date: May 22, 2014

(65) Prior Publication Data
US 2016/0273189 A1 Sep. 22, 2016

(30) Foreign Application Priority Data
Nov. 13, 2012 (JP) .................. 2012-249570

(51) Int. Cl.
*B25G 3/34* (2006.01)
*F16B 11/00* (2006.01)
(Continued)

(52) U.S. Cl.
CPC ............ *E02F 9/0816* (2013.01); *B23K 31/02* (2013.01); *E02F 9/0808* (2013.01)

(58) Field of Classification Search
CPC ................ B23K 31/02; B23K 2201/00; B23K 2201/35; E02F 9/0808; E02F 9/0816; B62D 65/00; B62D 55/08
(Continued)

(56) References Cited

U.S. PATENT DOCUMENTS 851,973 A * 4/1907 Aus ...................... B23K 33/006
52/838
1,450,935 A * 4/1923 Anderson ............ B23K 33/006
138/102
(Continued)

FOREIGN PATENT DOCUMENTS

CN 102430866 A 5/2012
JP 58141846 A * 8/1983 ............. B32K 31/02
(Continued)

OTHER PUBLICATIONS

International Search Report dated Jan. 14, 2014 from Application No. PCT/JP2013/078677.

*Primary Examiner* — Amber Anderson
*Assistant Examiner* — Nahid Amiri (57) ABSTRACT

A welded structure makes a relationship between one intermittent weld which fixes a long member to a base material and the other intermittent weld which fixes a plate-shaped member to the long member appropriately respond to a type of a load which dominantly acts on the long member. A lower long side edge of a beam member which serves as the long member is fixed onto a machine body frame which serves as the base material by intermittent welds. A top plate which serves as the plate-shaped member is fixed onto an upper long side edge of the beam member by the other intermittent welds. In a region where a load which twists the top plate dominantly acts on the beam member, a parallel weld portion in which the intermittent welds and the intermittent welds are welded in a parallel weld form is employed, and in a region where a bending load from the top plate dominantly acts on the beam member, the zigzag weld portion in which the intermittent weld and the intermittent weld are welded in a zigzag weld form is employed.

15 Claims, 7 Drawing Sheets

(51) Int. Cl.
*F16B 12/04* (2006.01)
*F16L 13/00* (2006.01)
*E02F 9/08* (2006.01)
*B23K 31/02* (2006.01)

(58) Field of Classification Search
USPC .............. 403/270, 271; 244/3.1–3.3; 296/29
See application file for complete search history.

(56) References Cited

U.S. PATENT DOCUMENTS

| | | | | |
|---|---|---|---|---|
| 2,527,479 | A * | 10/1950 | Hall | B23K 11/115 |
| | | | | 16/221 |
| 3,101,272 | A | 8/1963 | Setzer | |
| 3,832,522 | A * | 8/1974 | Arikawa | B23K 9/30 |
| | | | | 219/125.12 |
| 4,461,447 | A | 7/1984 | Gottlob | |
| 6,579,626 | B1 * | 6/2003 | Ottinger | B23K 11/02 |
| | | | | 219/121.64 |
| 7,182,291 | B2 * | 2/2007 | Westre | B64C 1/18 |
| | | | | 244/119 |
| 7,416,212 | B2 * | 8/2008 | Iwasaki | B60R 21/045 |
| | | | | 280/751 |
| 7,458,633 | B2 * | 12/2008 | Takeuchi | E02F 9/02 |
| | | | | 296/204 |
| 8,662,574 | B2 * | 3/2014 | Mildner | B62D 25/025 |
| | | | | 296/187.08 |
| 8,727,427 | B2 * | 5/2014 | Fujita | B62D 21/152 |
| | | | | 296/193.06 |
| 2005/0172527 | A1 * | 8/2005 | Mimuro | B62D 21/186 |
| | | | | 37/466 |
| 2008/0052908 | A1 * | 3/2008 | Reed | B62D 25/04 |
| | | | | 29/897.2 |
| 2008/0246312 | A1 * | 10/2008 | Katoh | B62D 25/04 |
| | | | | 296/203.04 |
| 2010/0140978 | A1 * | 6/2010 | Utsunomiya | B23K 11/115 |
| | | | | 296/193.09 |
| 2015/0209909 | A1 * | 7/2015 | Shimada | B23K 33/008 |
| | | | | 403/271 |
| 2015/0210054 | A1 * | 7/2015 | Poiret | B60K 37/00 |
| | | | | 403/270 |
| 2016/0082542 | A1 * | 3/2016 | Hiramatsu | B23K 35/0205 |
| | | | | 403/270 |

FOREIGN PATENT DOCUMENTS

| | | |
|---|---|---|
| JP | 63-031437 | 2/1988 |
| JP | 2-46979 A | 2/1990 |
| JP | 2005-299238 A | 10/2005 |
| JP | 2006-159581 A | 6/2006 |
| JP | 2012-007466 A | 1/2012 |
| WO | 2011/038879 | 4/2011 |

* cited by examiner

FIG. 9

WELDED STRUCTURE AND MACHINERY

CROSS-REFERENCE TO RELATED APPLICATIONS

This application is a National Stage of International Patent Application No. PCT/JP2013/078677, filed Oct. 23, 2013, which claims priority to foreign Japanese Patent Application No. 2012-249570, filed Nov. 13, 2012, the contents of which are incorporated herein by reference in their entirety.

TECHNICAL FIELD

The present invention relates to a welded structure which has an intermittent welded structure, and a work machine which uses the welded structure.

BACKGROUND

In general, in fillet welding or the like, continuous welding which can obtain high welding strength by continuously welding a series of welding locations, and intermittent welding which intermittently welds a series of welding locations to each other for reducing processing cost and reducing thermal strain, are appropriately selected and used.

As the intermittent welding, parallel welding (or abreast intermittent welding) which intermittently welds one side and the other side of a material in parallel (or abreast) and zigzag welding which intermittently welds both sides in a shape of a zigzag, are known (for example, refer to PTL 1 to PTL 4).

CITATION LIST

Patent Literature

[PTL 1] JP-UM-A-62-50192
[PTL 2] JP-A-1-180784
[PTL 3] JP-A-2-46979
[PTL 4] Japanese Patent No. 2583710

SUMMARY OF INVENTION

Technical Problem

Figure 9:
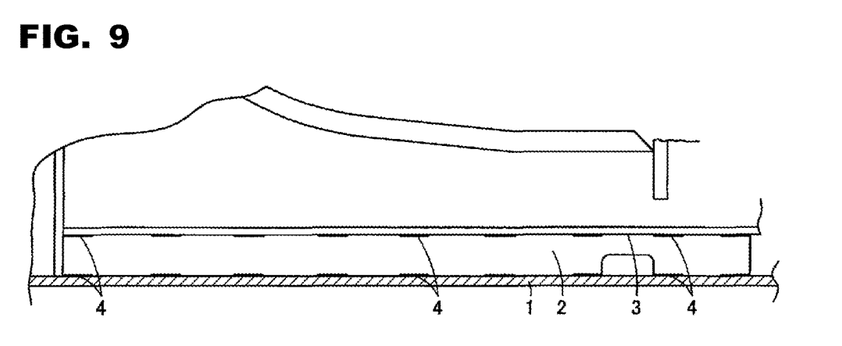
FIG. 9 is a sectional view of the machine body structure illustrating an example of intermittent welding in the related art.

In the related art, it is not apparent that parallel welding and zigzag welding are more appropriate to which type of load. For this reason, for example, in a machine body structure of a hydraulic excavator which is illustrated in FIG. 9, it is general to make a parallel weld portion 4 in which an intermittent weld of a lower side edge of a beam member 2 with respect to a machine body frame 1 of an upper turning body and an intermittent weld of a top plate 3, such as a cooling unit attaching plate or the like with respect to an upper side edge of the beam member 2 are welded in a parallel weld form. However, the inventors of the present invention have found that there is a case where only such a single intermittent welding is not appropriate according to a type of a dominant load which acts on the beam member 2.

In consideration of such a situation, an object of the present invention is to provide a welded structure which makes a relationship between one intermittent weld which fixes a long member to a base material and the other intermittent weld which fixes a plate-shaped member to the long member appropriately respond to a type of a dominant load which acts on the long member, and a work machine which uses the welded structure.

Solution to Problem

The invention can be described as a welded structure, including: a base material; a long member having two long side edges in which one long side edge is fixed to the base material by one intermittent weld; a plate-shaped member which is fixed to the other long side edge of the long member by the other intermittent weld; a parallel weld portion in which one intermittent weld and the other intermittent weld are welded in a parallel weld form in a region where a load which twists the plate-shaped member dominantly acts on the long member; and a zigzag weld portion in which one intermittent weld and the other intermittent weld are welded in a zigzag weld form in a region where a bending load from the plate-shaped member dominantly acts on the long member.

The invention can be described as a welded structure in which the parallel weld portion and the zigzag weld portion are mixed in one long member.

The invention can be described as a work machine, including: a machine body; and a work device and a mounting equipment which are mounted on the machine body, in which the machine body includes a welded structure according to embodiments of the disclosed subject matter, a machine body frame which serves as a base material, a beam member which serves as a long member welded on the machine body frame, and a top plate which serves as a plate-shaped member welded on the beam member, and in which the top plate includes an attaching portion of a mounting equipment which is attached to a position separated from the beam member in a horizontal direction.

Advantageous Effects of Invention

According to one or more embodiments of the invention, when one long side edge of the long member is fixed to the base material by one intermittent weld, and the plate-shaped member is fixed to the other long side edge of the long member by the other intermittent weld, by selecting the parallel weld portion in which one intermittent weld and the other intermittent weld are welded in the parallel weld form and the zigzag weld portion in which one intermittent weld and the other intermittent weld are welded in the zigzag weld form, and by selecting the parallel weld portion in the region where the load which twists the plate-shaped member dominantly acts on the long member, it is possible to reduce stress generated in the long member to be less than that of a case of the zigzag weld portion. By selecting the zigzag weld portion in the region where the bending load from the plate-shaped member dominantly acts on the long member, it is possible to reduce the stress generated in the long member to be less than that of a case of the parallel weld portion, to make the intermittent weld form appropriately respond to the type of the load which dominantly acts on the long member. Accordingly, it is possible to provide the welded structure which can relatively increase structure strength.

According to one or more embodiments of the invention, in the region where the parallel weld portion and the zigzag weld portion are mixed with respect to one long member, and the load which twists the plate-shaped member dominantly acts on the long member, by selecting the parallel weld portion, it is possible to reduce the stress generated in the long member to be less than that of a case of the zigzag weld portion. In the region where the bending load from the plate-shaped member dominantly acts on the zigzag weld portion, by selecting the zigzag weld portion, it is possible to reduce the stress generated in the long member to be less than that of a case of the parallel weld portion, to make the relationship between one intermittent weld and the other intermittent weld appropriately respond to the type of the dominant load which varies according to the position of the long member. Accordingly, it is possible to provide a welded structure which relatively increases structure strength to be greater than that of a case where a common type intermittent weld is used across the entire long member.

According to one or more embodiments of the invention, in the welded structure which is included in the machine body having the work device and the mounting equipment mounted thereon in the work machine, when one long side edge of the beam member is fixed to the machine body frame by one intermittent weld, and the top plate which is provided with the attaching portion of the mounting equipment is fixed to the other long side edge of the beam member by the other intermittent weld, by selecting the parallel weld portion in which one intermittent weld and the other intermittent weld are welded in the parallel weld form and the zigzag weld portion in which one intermittent weld and the other intermittent weld are welded in the zigzag weld form, and by selecting the parallel weld portion in the region where the load which twists the top plate dominantly acts on the beam member, it is possible to reduce the stress generated in the beam member to be less than that of a case of the zigzag weld portion. By selecting the zigzag weld portion in the region where the bending load from the top plate dominantly acts on the beam member, it is possible to reduce the stress generated in the beam member to be less than that of a case of the parallel weld portion, to make the intermittent weld form appropriately respond to the type of load which dominantly acts on the beam member. Accordingly, it is possible to provide the work machine which can relatively increase structure strength.

BRIEF DESCRIPTION OF DRAWINGS

FIG. 4(a) is a schematic perspective view illustrating a case where the twisting load dominantly acts. FIG. 4(b) is a view illustrating the distribution of stress when the twisting load acts on the long member of the parallel weld. FIG. 4(c) is a view illustrating the distribution of stress when the twisting load acts on the long member of the zigzag weld.

FIG. 5(a) is a schematic perspective view illustrating a case where the bending load dominantly acts. FIG. 5(b) is a view illustrating the distribution of the stress when the bending load acts on the long member of the parallel weld. FIG. 5(c) is a view illustrating the distribution of the stress when the bending load acts on the long member of the zigzag weld.

DESCRIPTION OF EMBODIMENTS

Hereinafter, the present invention will be described in detail based on one embodiment with reference to FIGS. 1 to 8.

Figure 6:
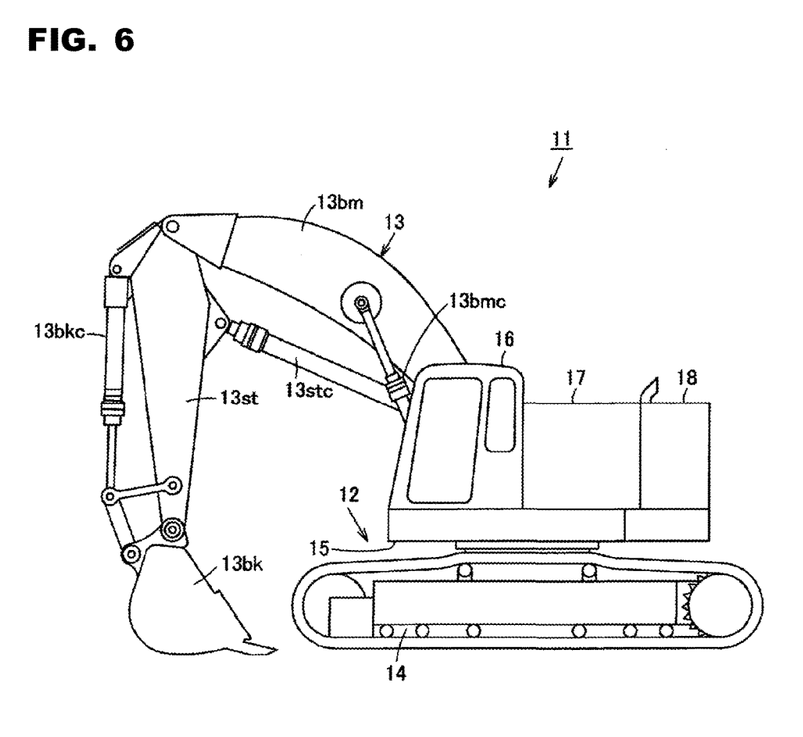
FIG. 6 is a side view illustrating one embodiment of a work machine according to the present invention.

FIG. 6 illustrates a hydraulic excavator 11 which serves as a work machine according to the present invention, and is provided with a machine body 12 and a work device 13 which is mounted on the machine body 12.

The machine body 12 is provided with a lower travelling body 14 and an upper turning body 15 which is provided to be able to turn with respect to the lower travelling body 14. In addition to the work device 13, a gap 16 which forms an operating room of an operator, a power device 17, and a counter weight 18 are mounted on the upper turning body 15.

In the work device 13, a base end of a boom 13$bm$ is pivotally supported to be freely rotatable by the upper turning body 15, a base end of a stick 13$st$ is pivotally supported to be freely rotatable by a tip end of the boom 13$bm$, a bucket 13$bk$ is pivotally supported to be freely rotatable by a tip end of the stick 13$st$, and each of these are rotated by a boom cylinder 13$bmc$, a stick cylinder 13$stc$, and a bucket cylinder 13$bkc$.

Figure 7:
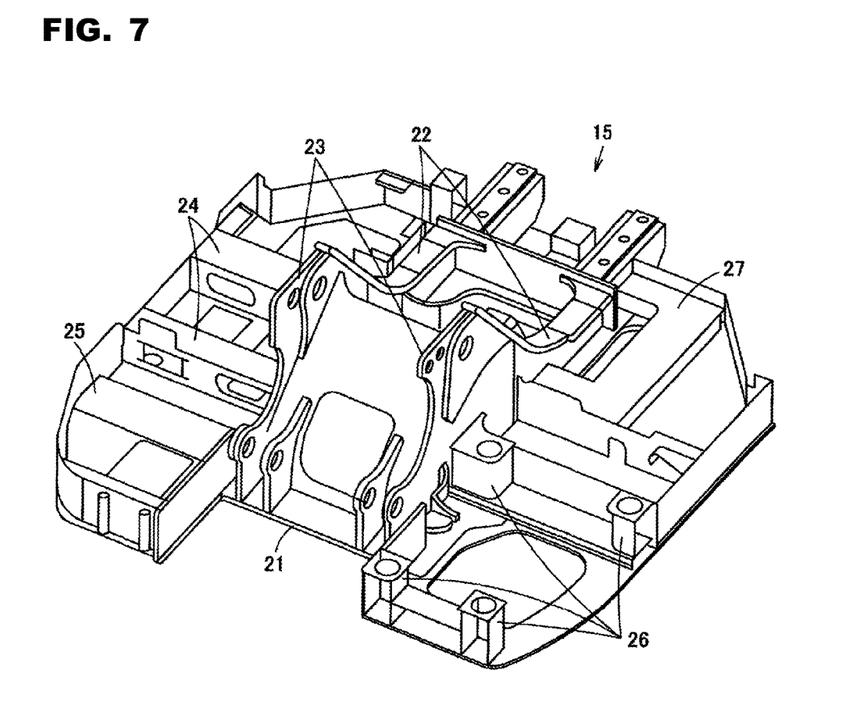
FIG. 7 is a perspective view illustrating an example of a machine body structure of the work machine.

FIG. 7 illustrates a main machine body structure of the upper turning body 15, and is provided with a work device attaching bracket 23 which is positioned on one pair of main rails 22 and as an extension therein of an I-type sectional structure which is disposed and welded on a center portion of a machine body frame 21 which serves as a base material, a tank mounting portion 24 of a box-shaped sectional structure which is disposed on one side portion of the work device attaching bracket 23, a control bulb mounting portion 25 of the box-shaped sectional structure which is disposed in front of the tank mounting portion 24, a plurality of gap mounting portions 26 of the box-shaped sectional structure which nips the work device attaching bracket 23 and is disposed on an opposite side, and a cooling unit mounting portion 27 of the box-shaped sectional structure which is disposed behind the gap mounting portion 26.

Figure 8:
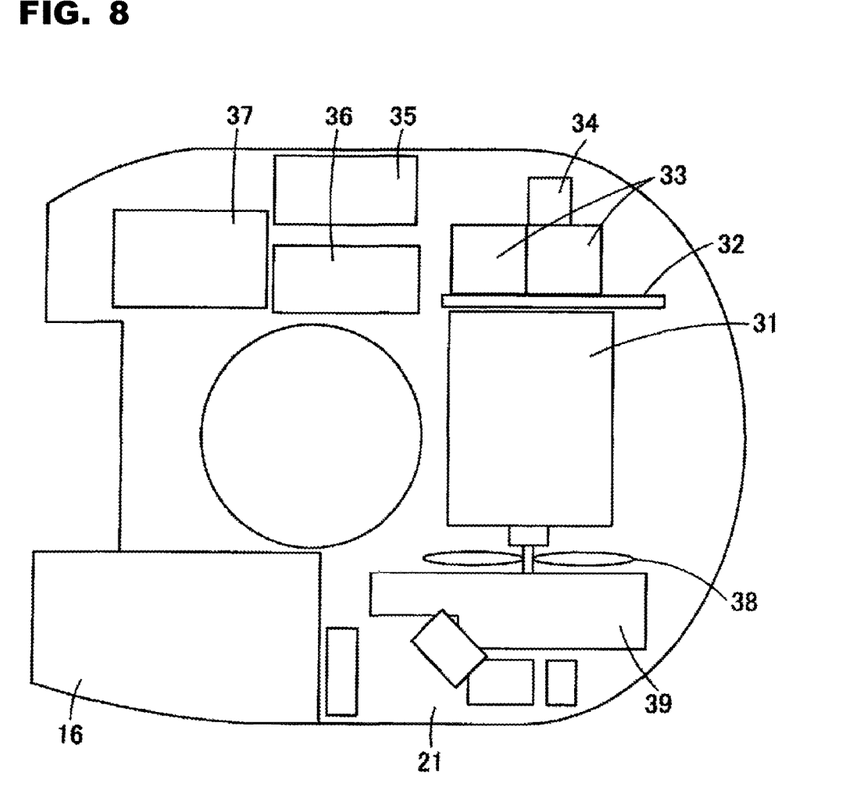
FIG. 8 is a plan view illustrating main disposition of equipment which is mounted on the machine body structure of the work machine.

As illustrated in FIG. 8, an engine 31 is disposed on the main rail 22, a main pump for a hydraulic circuit 33 and a pilot pump 34 which are driven by the engine 31 are disposed on a side of the engine 31 via a fire wall 32, a fuel tank 35 and an operating oil tank for a hydraulic circuit 36 are mounted on the tank mounting portion 24, a control bulb 37 for controlling the hydraulic circuit is mounted on the control bulb mounting portion 25, the gap 16 is mounted on the gap mounting portion 26, and a cooling unit 39 which opposes a cooling fan 38 which is driven by the engine 31 and serves as a mounting equipment in which a radiator, an oil cooler, and an outer cooler are integrated is mounted on the cooling unit mounting portion 27.

Figure 1:
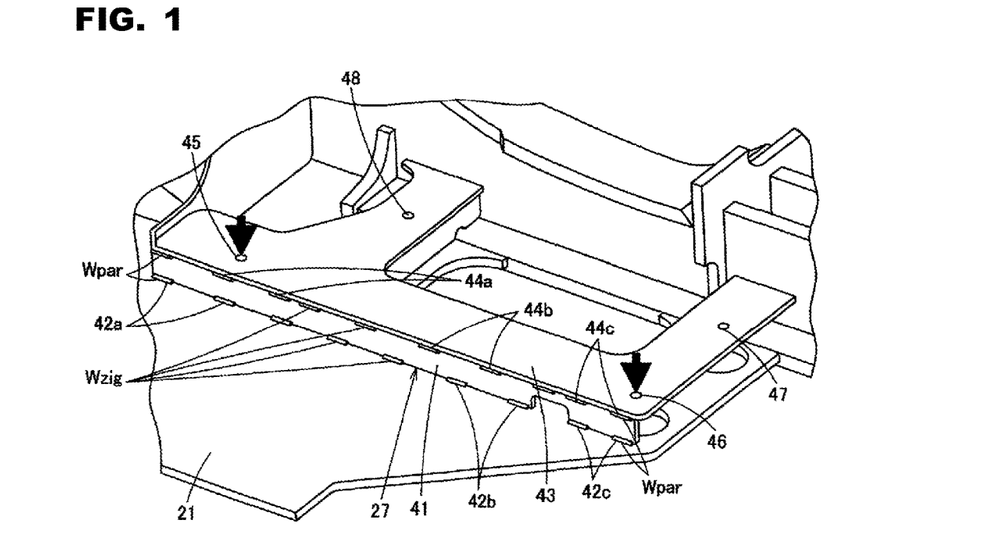
FIG. 1 is a perspective view illustrating one embodiment of a welded structure according to the present invention.
Figure 2:
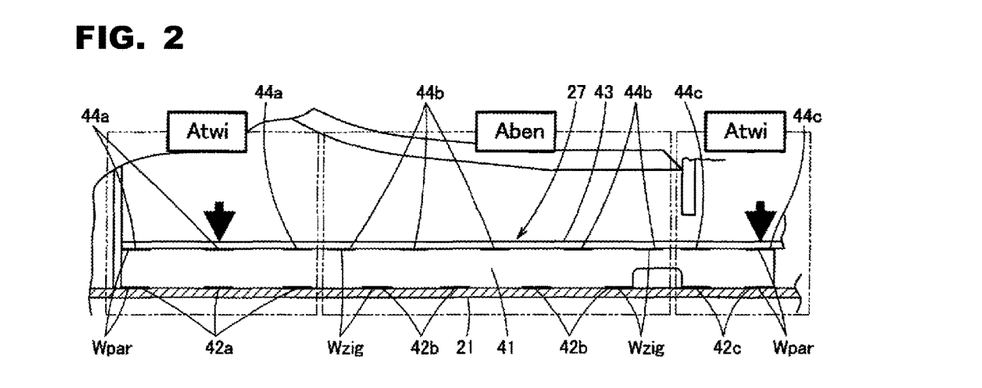
FIG. 2 is a front view of the welded structure.

FIGS. 1 and 2 illustrate a welded structure in the cooling unit mounting portion 27 in the machine body structure of the upper turning body 15, one (lower) long side edge of a beam member 41 which serves as a long member having two long side edges is fixed onto the machine body frame 21 which serves as a base material is fixed by intermittent welds 42a, 42b, and 42c, and a top plate 43 which serves as a plate-shaped member is fixed onto the other (upper) long side edge of the beam member 41 by the other intermittent welds 44a, 44b, and 44c.

As illustrated in FIG. 1, the top plate 43 has attaching holes 45, 46, 47, and 48 which function as attaching portions for attaching the cooling unit 39 that serves as the mounting equipment, to a position which is separated from the beam member 41 in a horizontal direction.

By positions of the attaching holes 45, 46, 47, and 48, in particular, by the positions of the attaching holes 45 and 46, a region Atwi in which a load which twists the top plate 43 dominantly acts on the beam member 41 as illustrated in FIG. 2, and a region Aben in which the influence of the twisting load is relatively weakened and a bending load from the top plate 43 dominantly acts on the beam member 41, are distinguished.

In the above-described welded structure, in the region Atwi in which the load which twists the top plate 43 dominantly acts on the beam member 41, a parallel weld portion Wpar in which the intermittent welds 42a and 42c and the other intermittent welds 44a and 44c are welded in a parallel weld form is employed as a welded joint, and in the region Aben in which the bending load from the top plate 43 dominantly acts on the beam member 41, a zigzag weld portion Wzig in one intermittent weld 42b and the other intermittent weld 44b are welded in a zigzag weld form is employed as a welded joint.

FIGS. 1 and 2 are examples in which the parallel weld portion Wpar and the zigzag weld portion Wzig are mixed in the beam member 41 which serves as one long member. However, for example, across a plurality of welding regions which are included in the plurality of long members in the tank mounting portion 24, the control bulb mounting portion 25, and the cooling unit mounting portion 27, the present invention can be employed even when the parallel weld portion and the zigzag weld portion are dispersed.

Figure 3:
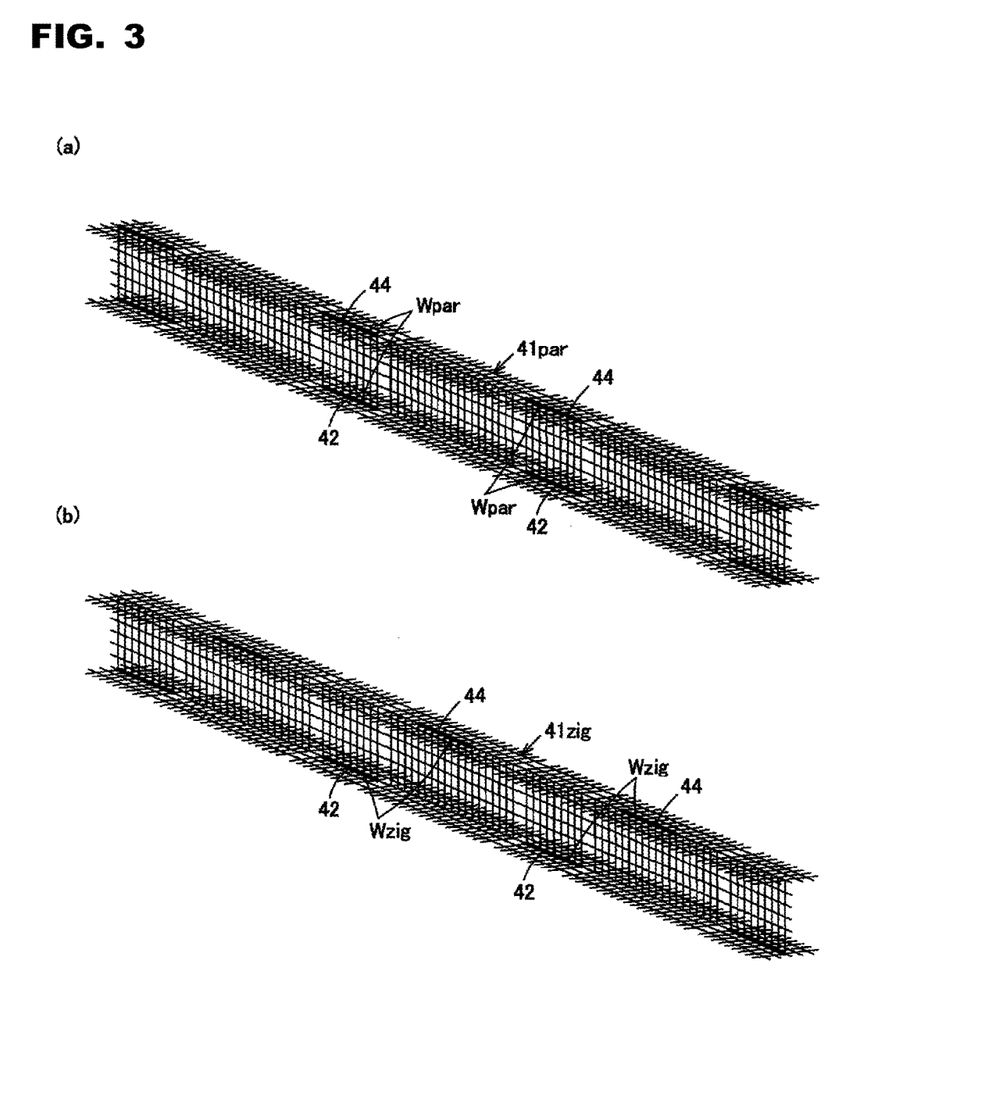
FIG. 3(a) is a schematic view of an intermittent welded structure illustrating parallel welding in the welded structure.
FIG. 3(b) is a schematic view of the intermittent welded structure illustrating zigzag welding in the welded structure.

Next, FIG. 3(a) is a schematic view of an intermittent welded structure of a beam member 41par which illustrates the parallel weld portion Wpar in which one (lower) intermittent weld 42 and the other (upper) intermittent weld 44 are welded in the parallel weld form. FIG. 3(b) is a schematic view of an intermittent welded structure of a beam member 41zig which illustrates the zigzag weld portion Wzig in which the one (lower) intermittent weld 42 and the other (upper) intermittent weld 44 are welded in the zigzag weld form.

In addition, as illustrated in FIG. 4(a), a load model in which a load Ltwi which twists the top plate 43 dominantly acts on the beam member 41, when the twisting load Ltwi acts on the beam member 41par of parallel welding, stress is distributed as illustrated in FIG. 4(b), and when the same twisting load Ltwi acts on the beam member 41zig of zigzag welding, stress is distributed as illustrated in FIG. 4(c). In FIGS. 4(b) and 4(c), a stress range which becomes higher as mesh in a grid pattern becomes narrower is shown, and the same mesh shows the same stress range.

When comparing the distribution of the stress under the same load as that when the load Ltwi which twists the top plate 43 acts on the beam member 41 as illustrated in FIGS. 4(b) and 4(c), the stress generated in the beam member 41par of parallel welding of FIG. 4(b) is approximately 85% of the stress generated in the beam member 41zig of zigzag welding of FIG. 4(c), that is, in the region where the load Ltwi which twists the top plate 43 dominantly acts on the beam member 41, a burden that the beam member 41par of parallel welding receives is approximately 85% of a burden that the beam member 41zig of zigzag welding receives. In other words, the beam member 41par of the parallel weld portion Wpar is more excellent than the beam member 41zig under the condition that the structure strength increases with respect to the twisting load Ltwi.

In addition, since a percentage of the stress is changed by a combination of a plate thickness of welded members and an interval of intermittent welding, the approximately 85% in the comparative example of the stress is merely an example.

Furthermore, as illustrated in FIG. 5(a), in a load model in which the bending load Lben which is perpendicular to the beam member 41 dominantly acts on the beam member 41, when the bending load Lben acts on the beam member 41par of parallel welding, stress is distributed as illustrated in FIG. 5(b), and when the same bending load Lben acts on the beam member 41zig of zigzag welding, stress is distributed as illustrated in FIG. 5(c). In FIGS. 5(b) and 5(c), a stress range which becomes higher as mesh in a grid pattern becomes narrower is shown, and the same mesh shows the same stress range.

When comparing the stress distribution under the same load as that when the bending load Lben acts on the beam member 41 as illustrated in FIGS. 5(b) and 5(c), the stress generated in the beam member 41zig of zigzag welding of FIG. 4(c) is approximately 90% of the stress generated in the beam member 41par of parallel welding of FIG. 4(b), that is, in the region where the perpendicular bending load Lben dominantly acts on the beam member 41, a burden that the beam member 41zig of zigzag welding receives is approximately 90% of a burden that the beam member 41par of parallel welding receives. In other words, the beam member 41zig of the zigzag weld portion Wzig is more excellent than the beam member 41par under the condition that the structure strength increases with respect to the bending load Lben. In addition, the approximately 90% in the comparative example of the stress is merely an example.

As a result, in the welded structure of the machine body 12 on which the mounting equipment, such as the work device 13 in the hydraulic excavator 11 that serves as the work machine and the cooling unit 39, are mounted, as illustrated in FIGS. 1 and 2, when the parallel weld portion Wpar in which the intermittent welds 42a and 42c and the other intermittent welds 44a and 44c are welded in the parallel weld form, and the zigzag weld portion Wzig in which one intermittent weld 42b and the other intermittent weld 44b are welded in the zigzag weld form, are mixed with respect to one beam member 41, in the region Atwi in which the load which twists the top plate 43 dominantly acts on the beam member 41, by selecting the parallel weld portion Wpar, it is possible to reduce the stress generated in the beam member 41 to be less than that of a case of the zigzag weld portion Wzig. By selecting the zigzag weld portion Wzig in the region Aben in which the bending load from the top plate 43 dominantly acts on the beam member 41, it is possible to reduce the stress generated in the beam member 41 to be less than that of a case of the parallel weld portion Wpar, to make the relationship between the intermittent welds 42a, 42b, and 42c and the other intermittent welds 44a, 44b, and 44c appropriately respond to the type of the dominant load which varies according to the location of the beam member 41, and to relatively increase structure strength to be greater than that of a case where a common type intermittent weld is used across the entire beam member 41.

Figure 4:
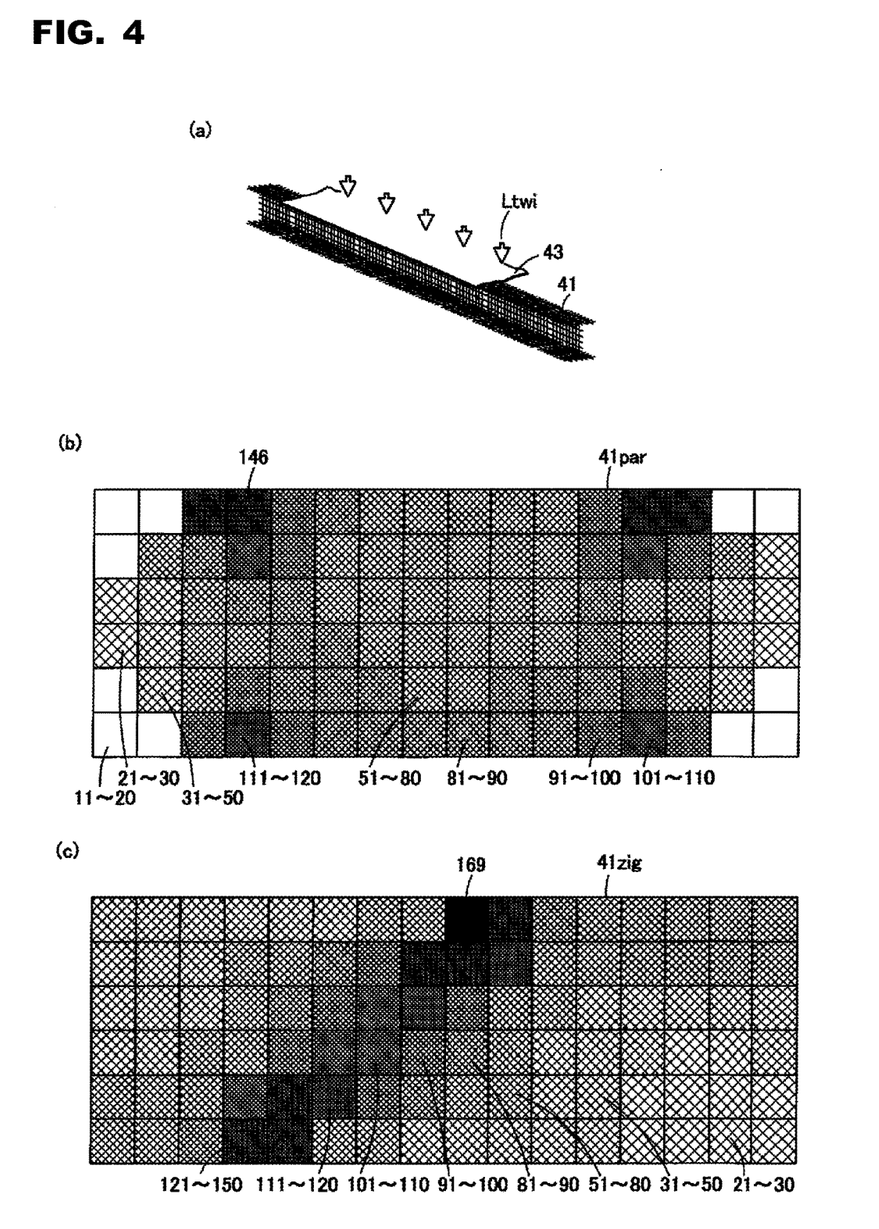
FIG. 4 illustrates a comparative example of stress under the same load as that when a load which twists a plate-shaped member acts on a long member of the welded structure.
Figure 5:
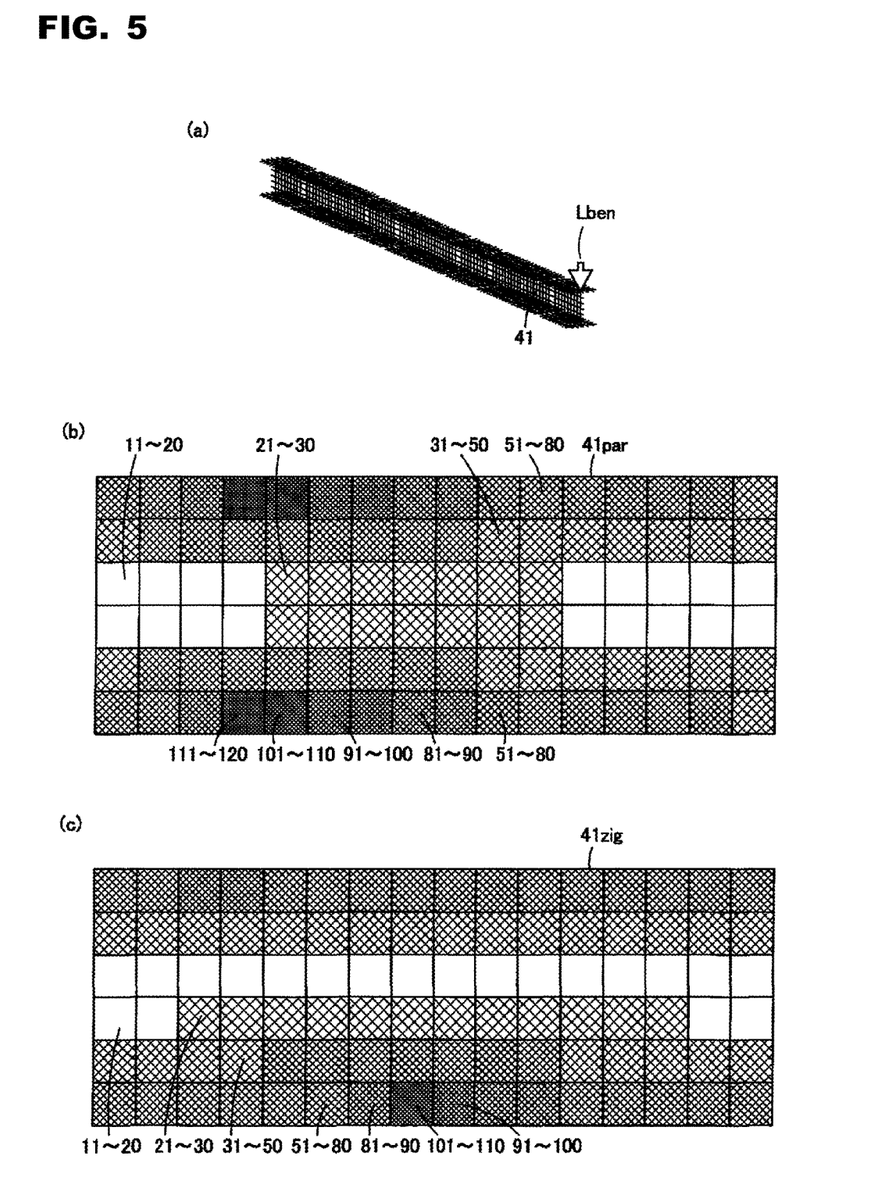
FIG. 5 illustrates a comparative example under the same load as that when perpendicular bending stress from the plate-shaped member acts on the long member of the welded structure.

In addition, when one long side edge of the beam member 41 which serves as the long member is fixed to the machine body frame 21 which serves as the base material by the intermittent welds 42a, 42b, and 42c, the top plate 43 which serves as the plate-shaped member that is provided in the attaching portion, such as the cooling unit 39 which serves as the mounting equipment is fixed to the other long side edge of the beam member 41 by the other intermittent welds 44a, 44b, and 44c, by selecting the parallel weld portion Wpar in which one intermittent weld 42 and the other intermittent weld 44 are welded in the parallel weld form as illustrated in FIG. 3(a), and the zigzag weld portion Wzig in which one intermittent weld 42 and the other intermittent weld 44 are welded in the zigzag weld form as illustrated in FIG. 3(b), and by selecting the parallel weld portion Wpar in the region where the load Ltwi which twists the top plate 43 dominantly acts on the beam member 41 as illustrated in FIG. 4, it is possible to reduce the stress generated in the beam member 41par of the parallel weld portion Wpar to be less than the stress generated in the beam member 41zig of the zigzag weld portion Wzig. By selecting the zigzag weld portion Wzig in the region where the bending load Lben dominantly acts on the beam member 41 as illustrated in FIG. 5, it is possible to reduce the stress generated in the beam member 41zig of the zigzag weld portion Wzig to be less than the stress generated in the beam member 41par of the parallel weld portion Wpar, to make the intermittent weld form appropriately respond to the type of the dominant loads Ltwi and Lben which act on the beam member 41, and to provide a welded structure and a work machine which relatively increases structure strength.

Furthermore, compared to continuous welding, it is needless to say that processing cost and thermal strain are reduced by intermittent welding.

Next, the welded structure of the present invention is not limited to the cooling unit mounting portion 27 of the box-shaped sectional structure, and for example, similarly, can be employed in the tank mounting portion 24 and the control bulb mounting portion 25 of the box-shaped sectional structure.

Even in the tank mounting portion 24 and the control bulb mounting portion 25, similarly to the cooling unit mounting portion 27, a welded structure in which one long side edge of the long member having two long side edges is fixed to the machine body frame 21 which serves as the base material by one intermittent weld, and the plate-shaped member is fixed to the other long side edge of the long member by the other intermittent weld is similarly employed. However, in the region where the load which twists the plate-shaped member dominantly acts on the long member, one intermittent weld and the other intermittent weld are welded in the parallel weld form, and in the region where the bending load dominantly acts on the long member, one intermittent weld and the other intermittent weld are welded in the zigzag weld form.

At this time, when the type of load which dominantly acts varies according to the location in each long member in each of the tank mounting portions 24 and 25, it is possible to appropriately mix the parallel weld portion Wpar and the zigzag weld portion Wzig in accordance with the load, and to provide a welded structure which can relatively increase structure strength more than a case where the common type intermittent welding is used across the entire long member.

In addition, when the type of load which dominantly acts mainly on each long member between each of the tank mounting portions 24 and 25 varies, it is possible to appropriately disperse the parallel weld portion Wpar and the zigzag weld portion Wzig in accordance with the load in each long member, and to increase structure strength to be greater than that of a case where the common type intermittent welding is used across the entire long member.

In addition, the work machine of the present invention is not limited to the turning type hydraulic excavator 11, and can be employed in other work machines which are provided with a work device in a non-turning type machine body frame, for example, a bulldozer and a wheel loader.

INDUSTRIAL APPLICABILITY

The present invention has a possible use for an operator who is involved in manufacturing, selling, and leasing welded structures and work machines.

REFERENCE SIGNS LIST

11 Hydraulic excavator as work machine
12 Machine body
13 Work device
21 Machine body frame as base material
39 Cooling unit as mounting equipment
41 Beam member as long member
42a, 42b, 42c One intermittent weld
43 Top plate as plate-shaped member
44a, 44b, 44c The other intermittent weld
45 to 48 Attaching hole as attaching portion of mounting equipment
Ltwi Twisting load
Atwi Region where twisting load dominantly acts
Wpar Parallel weld portion
Lben Bending load
Aben Region where bending load dominantly acts
Wzig Zigzag weld portion

The invention claimed is:
1. A welded structure, comprising:
a base material;
a long member having a length greater than a width and two long side edges in which one long side edge is fixed to the base material by a first intermittent weld series;
a plate-shaped member which is fixed to the other long side edge of the long member by a second intermittent weld series;
a parallel weld portion in which a first set of intermittent weld portions of the first intermittent weld series and a first set of intermittent weld portions of the second intermittent weld series are welded in a parallel weld form with respect to each other in a first region where a load which twists the plate-shaped member dominantly acts on the long member, such that corresponding weld portions of the first sets of intermittent weld portions are directly across from and aligned with each other; and
a zigzag weld portion in which a second set of intermittent weld portions of the first intermittent weld series and a second set of intermittent weld portions of the second intermittent weld series are welded in a zigzag weld form with respect to each other in a second region where a bending load from the plate-shaped member dominantly acts on the long member, such that the weld portions of the second sets of intermittent weld portions are not directly across from and aligned with each other, wherein the parallel weld portion and the zigzag weld portion do not overlap.

2. The welded structure according to claim 1, wherein the parallel weld portion and the zigzag weld portion alternate along the length of the long member.

3. The welded structure according to claim 1, wherein the intermittent weld portions of the parallel weld portion are exclusive of the intermittent weld portions of the zigzag weld portion.

4. The welded structure according to claim 1, further comprising two of said parallel weld portions, the parallel weld portions and the zigzag weld portion alternate along the long member, with the parallel weld portions being at respective ends of the long member.

5. The welded structure according to claim 1, wherein the first region where the load which twists the plate-shaped member dominantly acts on the long member is at a center portion of the long member in a length direction of the long member.

6. The welded structure according to claim 1,
wherein the one long side edge of the long member is fixed to a first surface of the base material,
wherein the other long side edge of the long member is fixed to a second surface of the plate-shaped member, and
wherein the first surface of the base material faces the second surface of the plate-shaped member.

7. The welded structure according to claim 1, wherein the parallel weld portion is adjacent to the zigzag weld portion.

8. The welded structure according to claim 1,
wherein the intermittent weld portions of the first intermittent weld series are in a first plane, and
wherein the intermittent weld portions of the second intermittent weld series are in a second plane different from the first plane.

9. A work machine, comprising:
a machine body; and
a work device and a mounting equipment which are mounted on the machine body,
wherein the machine body includes:
a welded structure having:
a base material,
a long member having a length greater than a width and two long side edges in which one long side edge is fixed to the base material by a first intermittent weld series,
a plate-shaped member which is fixed to the other long side edge of the long member by a second intermittent weld series,
a parallel weld portion in which a first set of intermittent weld portions of the first intermittent weld series and a first set of intermittent weld portions of the second intermittent weld series are welded in a parallel weld form with respect to each other in a first region where a load which twists the plate-shaped member dominantly acts on the long member, such that corresponding weld portions of the first sets of intermittent weld portions are directly across from and aligned with each other, and
a zigzag weld portion in which a second set of intermittent weld portions of the first intermittent weld series and a second set of intermittent weld portions of the second intermittent weld series are welded in a zigzag weld form with respect to each other in a second region where a bending load from the plate-shaped member dominantly acts on the long member, such that the weld portions of the second sets of intermittent weld portions are not directly across from and aligned with each other,
wherein a machine body frame serves as the base material, a beam member serves as the long member welded on the machine body frame, and a top plate serves as the plate-shaped member welded on the beam member,
wherein the top plate includes an attaching portion of the mounting equipment which is attached to a position separated from the beam member in a horizontal direction, and
wherein the intermediate weld portions of the parallel weld portion are exclusive of the intermediate weld portions of the zigzag weld portion.

10. The work machine according to claim 9, wherein the parallel weld portion and the zigzag weld portion do not overlap.

11. The work machine according to claim 9, further comprising two of said parallel weld portions, the parallel weld portions and the zigzag weld portion alternate along the long member, with the parallel weld portions being at respective ends of the long member and the zigzag weld portion between the parallel weld portions.

12. The work machine according to claim 9, wherein the first region where the load which twists the plate-shaped member dominantly acts on the long member is at a center portion of the long member in a length direction of the long member.

13. The work machine according to claim 9,
wherein the one long side edge of the long member is fixed to a first surface of the base material,
wherein the other long side edge of the long member is fixed to a second surface of the plate-shaped member, and
wherein the first surface of the base material faces the second surface of the plate-shaped member.

14. The work machine according to claim 9, wherein the parallel weld portion is adjacent to the zigzag weld portion.

15. The work machine according to claim 9,
wherein the intermittent weld portions of the first intermittent weld series are in a first plane, and
wherein the intermittent weld portions of the second intermittent weld series are in a second plane different from the first plane.

* * * * *